(12) United States Patent
Ludwick et al.

(10) Patent No.: US 12,051,304 B2
(45) Date of Patent: Jul. 30, 2024

(54) SYSTEMS AND METHODS FOR PROVIDING ONE OR MORE INSTANT FEATURES RANDOMLY FROM A PLURALITY OF INSTANT FEATURES IN ELECTRONIC GAMING

(71) Applicant: Aristocrat Technologies, Inc., Las Vegas, NV (US)

(72) Inventors: John Ludwick, Reno, NV (US); Christmas Uberuaga, Reno, NV (US); Blake Davis, Las Vegas, NV (US); Allon Englman, Las Vegas, NV (US); Jose Uberuaga, Reno, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 59 days.

(21) Appl. No.: 17/710,267

(22) Filed: Mar. 31, 2022

(65) Prior Publication Data
US 2023/0101859 A1 Mar. 30, 2023

Related U.S. Application Data

(60) Provisional application No. 63/250,680, filed on Sep. 30, 2021.

(51) Int. Cl.
*G07F 17/32* (2006.01)
*G06F 7/58* (2006.01)

(52) U.S. Cl.
CPC .......... *G07F 17/3267* (2013.01); *G06F 7/588* (2013.01); *G07F 17/3213* (2013.01)

(58) Field of Classification Search
CPC ............. G07F 17/3213; G07F 17/3267; G07F 17/34; G07F 17/3244; G06F 7/588
See application file for complete search history.

(56) References Cited

U.S. PATENT DOCUMENTS 6,186,894 B1 * 2/2001 Mayeroff ................ G07F 17/34
463/16
10,373,441 B1 * 8/2019 Halvorson .......... G07F 17/3213
(Continued)

FOREIGN PATENT DOCUMENTS

AU 2011101248 B4 7/2012

OTHER PUBLICATIONS

DL Slot Vids, "Acorn Pixie Slot Machine-Buy a Bonus Feature Buyer Beware!!", https://www.youtube.com/watch?v=VHfjbWITdOY, 2015.

(Continued)

*Primary Examiner* — Justin L Myhr
(74) *Attorney, Agent, or Firm* — Armstrong Teasdale LLP

(57) ABSTRACT

An electronic gaming device is described. The device is configured to receive an input requesting play of a feature game, initiate the feature game wherein the feature game includes a plurality of reels, and randomly determine, based upon a first output from a random number generator (RNG), at least one instant feature. The device is also configured to determine a table of symbols associated with the at least one instant feature and populate at least one reel position of at least one reel with at least one symbol from the table of symbols wherein the at least one symbol is associated with the at least one instant feature. The device is further configured to, based upon a second output from the RNG, determine an outcome for the feature game and control display of the feature game including presentation of the at least one instant feature.

14 Claims, 18 Drawing Sheets

(56) References Cited

U.S. PATENT DOCUMENTS

| | | | |
|---|---|---|---|
| 2009/0124353 A1 | 5/2009 | Collette | |
| 2009/0197664 A1 | 8/2009 | Schultz | |
| 2009/0233702 A1 | 9/2009 | Bramble | |
| 2009/0233703 A1 | 9/2009 | Barnes | |
| 2009/0239641 A1* | 9/2009 | Abe | G07F 17/3202 463/20 |
| 2010/0124981 A1* | 5/2010 | Kato | G07F 17/32 463/20 |
| 2010/0137061 A1 | 6/2010 | Ellis | |
| 2011/0183743 A1 | 7/2011 | Stevens | |
| 2012/0015707 A1* | 1/2012 | Hornik | G07F 17/3258 463/20 |
| 2012/0122544 A1 | 5/2012 | Roemer | |
| 2012/0178519 A1 | 7/2012 | Walker | |
| 2012/0289301 A1 | 11/2012 | Cuddy | |
| 2013/0281170 A1 | 10/2013 | Weiss | |
| 2013/0288782 A1 | 10/2013 | Hornik | |
| 2014/0057697 A1 | 2/2014 | Nelson | |
| 2014/0094282 A1 | 4/2014 | Bryant | |
| 2015/0317877 A1 | 11/2015 | Rodgers | |
| 2015/0371489 A1 | 12/2015 | Aoki | |
| 2016/0225233 A1 | 8/2016 | Arezina | |
| 2017/0365127 A1* | 12/2017 | Zoble | G07F 17/34 |
| 2018/0197379 A1* | 7/2018 | Crispino | G07F 17/3269 |
| 2018/0218564 A1* | 8/2018 | Elmqvist | G07F 17/34 |
| 2019/0073876 A1* | 3/2019 | Satterlie | G07F 17/3267 |
| 2020/0005587 A1* | 1/2020 | Hartl | G07F 17/3286 |
| 2020/0402351 A1 | 12/2020 | Wotton | |

OTHER PUBLICATIONS

All Casino Action, "Bough a Bonus For Christmas! Christmas Vacation Slot Machine!", Slot Lady Gaming, https://www.youtube.com/watch?v=JbJHb53NZIs, 2020.

* cited by examiner

SYSTEMS AND METHODS FOR PROVIDING ONE OR MORE INSTANT FEATURES RANDOMLY FROM A PLURALITY OF INSTANT FEATURES IN ELECTRONIC GAMING

CROSS REFERENCE TO RELATED APPLICATION

This application claims the benefit of priority to U.S. Provisional Patent Application No. 63/250,680, filed Sep. 30, 2021, the contents of which are incorporated herein by reference in their entirety.

TECHNICAL FIELD

The field of disclosure relates generally to electronic gaming, and more particularly, to systems and methods for providing an instant feature in electronic gaming.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, an electronic gaming device is described. The electronic gaming device includes at least one processor in communication with at least one memory device with instructions stored thereon. The instructions, when executed by the at least one processor, cause the at least one processor to receive an input requesting play of a feature game, based upon receiving the input, initiate the feature game wherein the feature game includes a plurality of reels, and randomly determine, based upon a first output from a random number generator (RNG), at least one instant feature of a plurality of instant features to provide in the feature game. The instructions also cause the at least one processor to, based upon the at least one instant feature, determine a table of symbols, of a plurality of tables of symbols, associated with the at least one instant feature for use in the feature game and populate at least one reel position of at least one reel of the plurality of reels for the feature game with at least one symbol from the table of symbols wherein the at least one symbol is associated with the at least one instant feature. The instructions further cause the at least one processor to, based upon a second output from the RNG, determine an outcome for at least one spin of the feature game and control display of the feature game including presentation of the at least one instant feature and the at least one spin.

In another aspect, an electronic gaming system is described. The electronic gaming system includes at least one memory device with instructions stored thereon and at least one processor in communication with the at least one memory device. The instructions, when executed by the at least one processor, cause the at least one processor to receive an input requesting play of an electronic game, based upon receiving the input, initiate the electronic game wherein the electronic game includes a plurality of symbol positions, and randomly determine, based upon a first random number generator (RNG) output, at least one feature of a plurality of features to provide in the electronic game. The instructions also cause the at least one processor to, based upon the at least one feature, determine a table of symbols, of a plurality of tables of symbols, associated with the at least one feature for use in the electronic game and configure at least one symbol position of the plurality of symbol positions for the electronic game with at least one symbol from the table of symbols wherein the at least one symbol is associated with the at least one feature. The instructions further cause the at least one processor to, based upon a second RNG output, determine an outcome for at least one play of the electronic game and cause presentation of the at least one feature and the at least one play of the electronic game.

In yet another aspect, a non-transitory computer-readable storage medium with instructions stored thereon is described. The instructions, in response to execution by at least one processor, cause the at least one processor to receive an input requesting play of an electronic game and in response to receiving the input, trigger the electronic game, wherein the electronic game includes a plurality of symbol positions. The instructions also cause the at least one processor to randomly determine, based upon a first random number generator (RNG) output, at least one feature of a plurality of features to provide in the electronic game and in response to determining the at least one feature, determine a table of symbols, of a plurality of tables of symbols, associated with the at least one feature for use in the electronic game. The instructions further cause the at least one processor to determine to configure at least one symbol position of the plurality of symbol positions for the electronic game with at least one symbol from the table of symbols wherein the at least one symbol is associated with the at least one feature, and wherein the at least one symbol position includes a reel and based upon a second RNG output, determine an outcome for at least one round of the electronic game, wherein the outcome for the at least one round includes presentation of the at least one feature during the at least one round of the electronic game.

DETAILED DESCRIPTION

Figure 1:
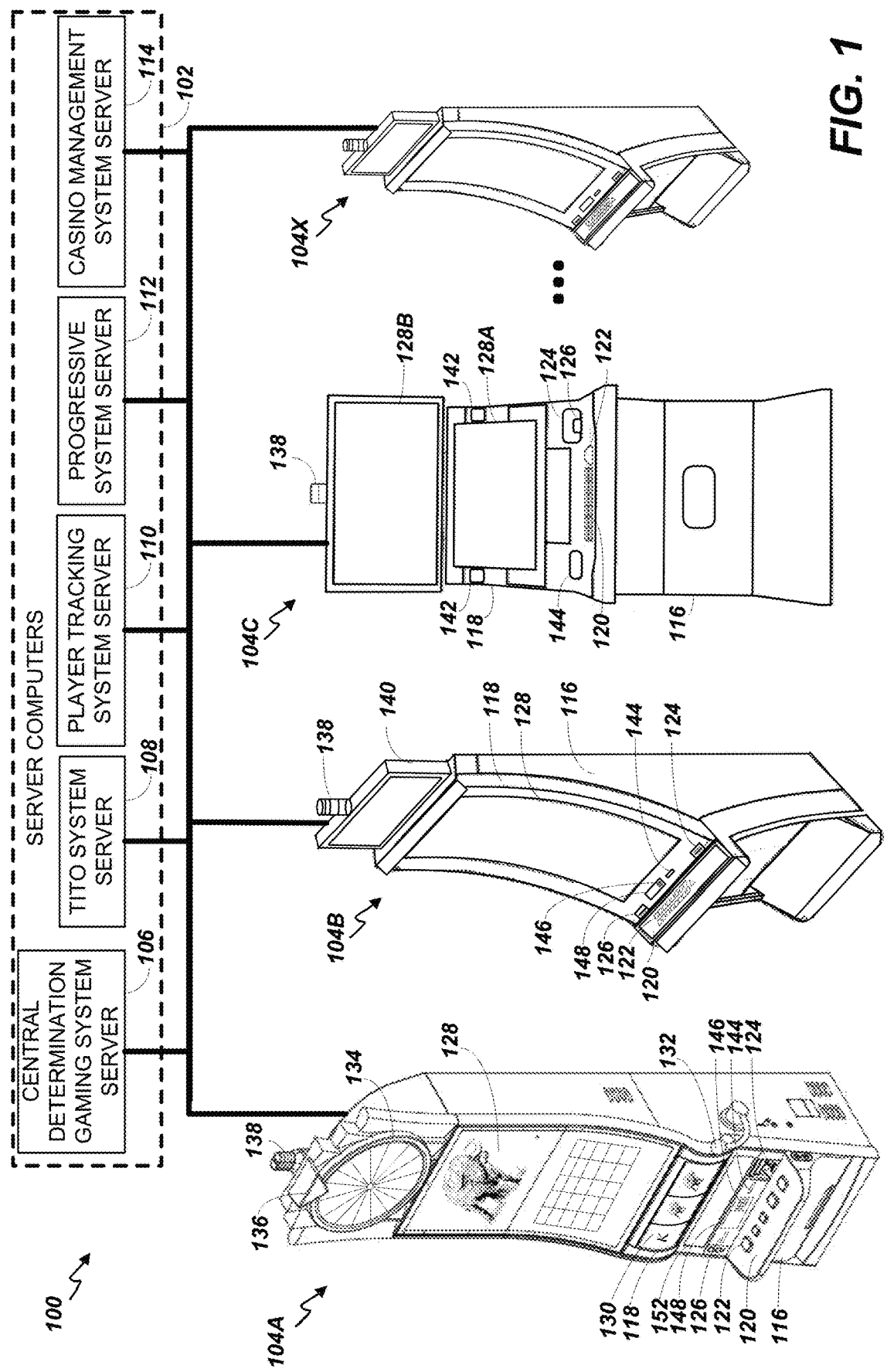
FIG. 1 is an exemplary diagram showing several EGMs networked with various gaming related servers.

Described herein are systems and methods for providing an instant feature in electronic gaming. In the example embodiment, an instant feature allows a player to purchase and/or otherwise select a game specific feature from a base game. In other words, during play of a base game, a player may purchase a game specific feature (e.g., instead of waiting for a base game outcome that would trigger the feature).

During the base game, an instant feature button (e.g., physical button or virtual button) is active/displayed. When the player selects the instant feature button, an instant feature scene is displayed that allows the player to buy/select a game feature. For example, the instant feature scene may include bet multipliers available for the player to select, dynamic wagers that update when changing bet multipliers, and specific wording and/or animations for each feature that may be selected.

When an instant feature is selected the player may be presented with a random number of instant features. For example, three instant features may correspond to three different colored coins/themes in a feature game wherein each colored coin is associated with a different instant feature. A player may select at least one, at least two, or all three instant features. In some embodiments, only at least one feature may be available for selection. Upon selection of at least one instant feature, one instant feature will be presented (e.g., determined randomly from the first, second, and third instant features) with the random possibility that at least one of the other instant features will also be presented (e.g., determined based in part upon an RNG call). Upon selection of at least two instant features, two instant features will be presented along with the random possibility that a third instant feature will also be presented (e.g., determined based in part upon an RNG call). Upon selection of all three instant features, all three instant features will be presented. Although the above example describes three instant features, any number of instant features may be available for selection/presentation.

In the example embodiment, an instant feature is a game enhancement applied to a feature game. For example, a feature game may be a reel game wherein symbols displayed are each associated with an output amount (e.g., the symbols displayed at reel positions are numbers associated with output amounts). In the example embodiment the instant features (e.g., associated with different colored coins) may include a large output amount/feature game award, a multiplier symbol causing all other displayed output amounts to be multiplied, and a symbol worth the sum of all other symbols displayed on the reels. Further, in the example embodiment, certain features may be applied in a determined/predetermined order (e.g., in an order that results in the highest outcome/output amount). For example, if two features are presented (e.g., two coins are displayed)—the feature associated with causing all displayed output amounts to be multiplied and the feature associated with a symbol worth the sum of all other symbols displayed on the reels—the multiplication may occur before the presentation of the sum of all other symbols displayed is presented.

While known electronic gaming systems may use an RNG to determine a game outcome, the systems and methods provided herein provide improvements and advantages over known systems. For example, the systems and methods described herein may utilize at least one RNG call along with one or more weighted tables (e.g., lookup tables) to determine how many instant features to provide. A first random determination may be made in order to determine how many instant features to provide. A next random determination may be made in order to determine which instant features to provide (e.g., after or concurrently with determining a number of features to provide). Yet another random determination may be made in order to determine the outcome of the feature game (e.g., based at least in part upon an amount inputted to purchase/select the feature game) wherein the feature game includes the randomly determined instant features. Accordingly, a wide variety of instant features and/or combinations of instant features are available, increasing the variety and number of possible feature game outcomes that may be provided (e.g., as opposed to known feature games, which do not include a random determination of a number of instant features to provide).

Further, certain technical problems arise when implementing the instant features described herein. For example, the number and/or which instant features that will be provided in the feature game may be unknown prior to the selection of a feature game. However, RTP still needs to be controlled during play of the feature game. In known electronic games including feature games, the odds of triggering a feature game from a base game may be controlled as a way of managing RTP. In the example game described herein, that known method is not available because the feature game may be triggered (e.g., purchased) at any time by a player. Accordingly, a solution/improvement for controlling RTP of the feature game that may be instantly triggered is described.

For example, after the feature game is triggered (e.g., and a random determination of features to be provided in the feature game is determined), the systems and methods described herein utilize different lookup table draws based upon which features will be provided in the feature game. Accordingly, the features to be presented are analyzed/identified (e.g., after being randomly determined), and at least one lookup table draw is performed. In other words, while the feature game may include the same set(s) of reels when the feature game is provided (e.g., each symbol position may be converted to its own reel), different lookup tables for that same set of reels may be utilized depending upon which features are determined to be provided in the feature game (e.g., the reels may include placeholders for feature/coin symbols that are replaced based upon the lookup table(s)). For instance, each reel in the feature game may include a certain number of "placeholders." Once the feature/features for the feature game are determined, the placeholders are replaced according to at least one randomly determined lookup table, of a plurality of lookup tables, including symbols associated with the feature(s) for that play of the feature game (e.g., and not symbols associated with feature(s) that are not included in that play of the feature game) and/or blanks and/or symbols not associated with a specific feature game (e.g., regular cash on reels symbols).

In one example, say blue, green, and red features are available for a feature game. If a blue feature is randomly determined, a lookup table is selected that includes blue feature coins (e.g., and not green or red feature coins), along with blanks and/or symbols not associated with a specific feature game. In another example, say red and green features are randomly determined. A lookup table is then selected that includes red and green feature coins, along with blanks and/or symbols not associated with a specific feature game. In the blue, green, red example, for instance, 7 different data buckets/pools of lookup tables are stored (e.g., blue only, green only, red only, blue+green, blue+red, green+red, and blue+green+red). Accordingly, based upon which features are determined, a data pool of lookup tables associated with those features is determined, and a random draw (e.g., based on an RNG call) is utilized to determine which lookup table in the pool of lookup tables should be used for that play of the feature game (e.g., including which symbols should replace the "placeholders").

Thus, the same reels are utilized for each play of the feature game, and separate reels do not need to be generated and stored for each possible combination of features that may be presented. Accordingly, computer efficiency is increased and computer resources are saved by the use of placeholders in reels that are used for each play, wherein the placeholders are replaced based upon a lookup table (e.g., randomly determined) including feature symbols/coins specific to the determined feature(s).

Accordingly, a random determination is made on a per spin basis (e.g., based upon a paytable) for each symbol position/reel as to whether no symbol will be displayed, a coin symbol (e.g., different from a feature symbol) will be displayed, and/or a feature symbol will be displayed based upon the reel (e.g., after the placeholders have been replaced). In some embodiments, the paytable and/or a different paytable may be utilized to control how frequently feature symbols are provided. In the example embodiment, any feature provided during the feature game will be provided before the first spin (e.g., initiation of the feature game causes a first instance of the features to be presented). However, other instances of those instant features may be provided throughout the feature game, and the odds of landing another instance of an instant feature may be influenced based upon how many instances of the instant feature have been presented in that play of the feature game (e.g., as a way to control RTP).

In other words, selection of a paytable for a particular spin may be randomly determined based at least in part upon how many features symbols have previously been displayed in that particular play of the feature game. For example, in a feature game wherein the first feature is provided, a first feature symbol is provided at the initiation of the feature game (e.g., whichever features that are determined to be provided in the feature game may be presented at the initiation of the feature game—and different instances of those features may be presented during subsequent spins of the feature game). The result of each subsequent spin may be determined based at least in part upon the fact that one first feature symbol has already been provided. If a second first feature symbol is provided during the feature game, the result of each subsequent spin may be determined based at least in part upon the fact that two first feature symbols have been provided (e.g., because two feature symbols have been provided, the odds of a third first feature symbol being provided may be lower than the odds of providing the second first feature symbol). In other words, different paytables may be utilized for subsequent spins of the feature game based upon how many feature symbols have been provided in that play of the feature game (e.g., to lower the odds of obtaining subsequent feature symbols).

Another improvement provided by the systems and methods described herein is the ordering of presentation of features in the feature game. For example, if more than one feature is to be provided, the features may be analyzed to determine which order the features should be presented in in order to maximize output to the player (e.g., or the order of presentation may be predetermined and stored). For example, if two features, one of a high output value and one of a multiplier value, are to be presented in the feature game, the system would determine to provide the high output value first, so that the high output value would be multiplied when the multiplier feature is provided (e.g., so that the multiplier is not applied before the high value is obtained). In some embodiments, a feature including a credit value of the summation of all displayed credit values may always be applied as the last feature (e.g., in order to capture all credit amounts, multipliers, etc.). In other words, if the summation feature would be provided first, certain high credit amounts and/or multiplied values may not be captured in the summation. Accordingly, in some embodiments, the summation feature may be provided as a last feature.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
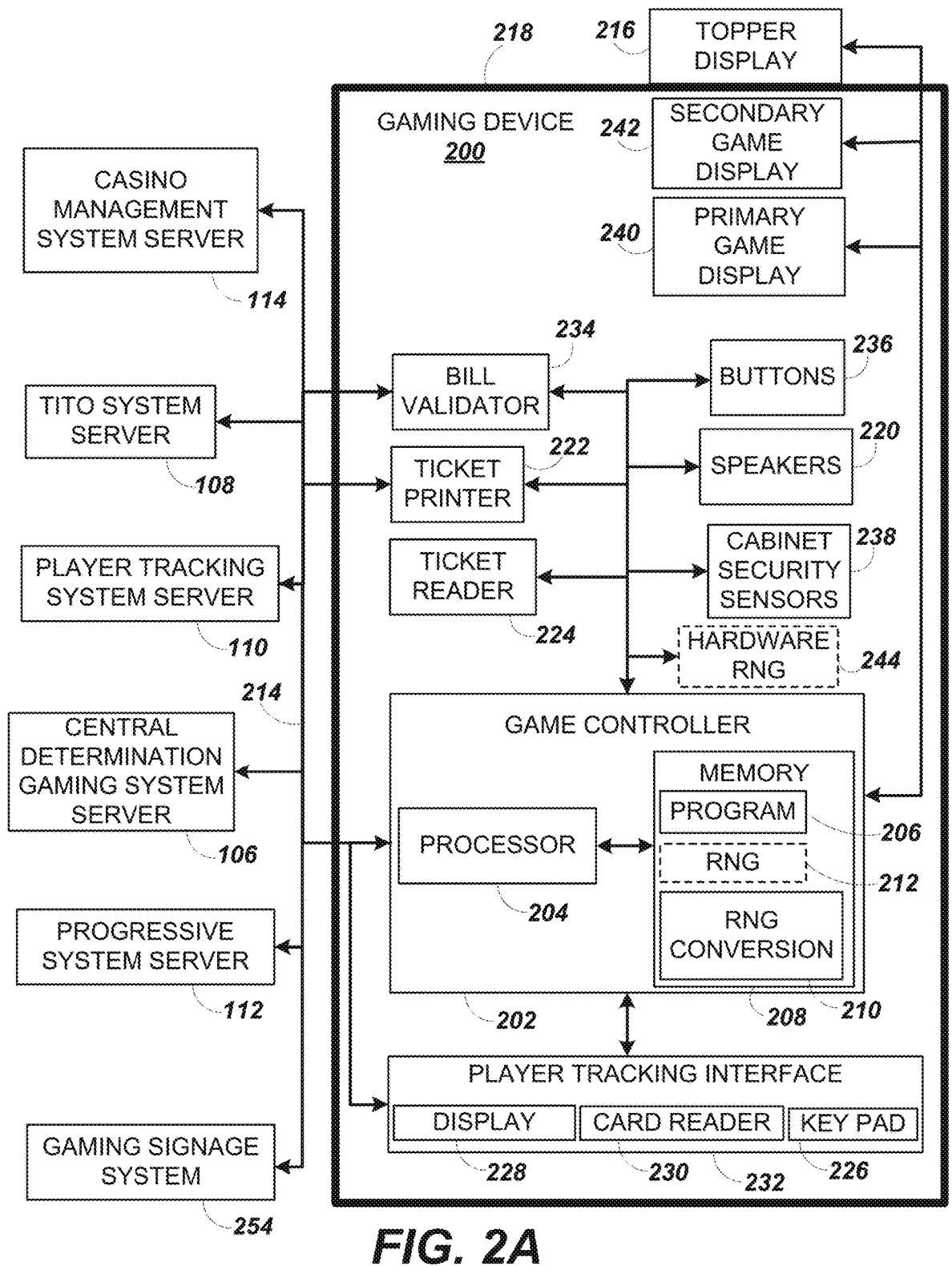
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
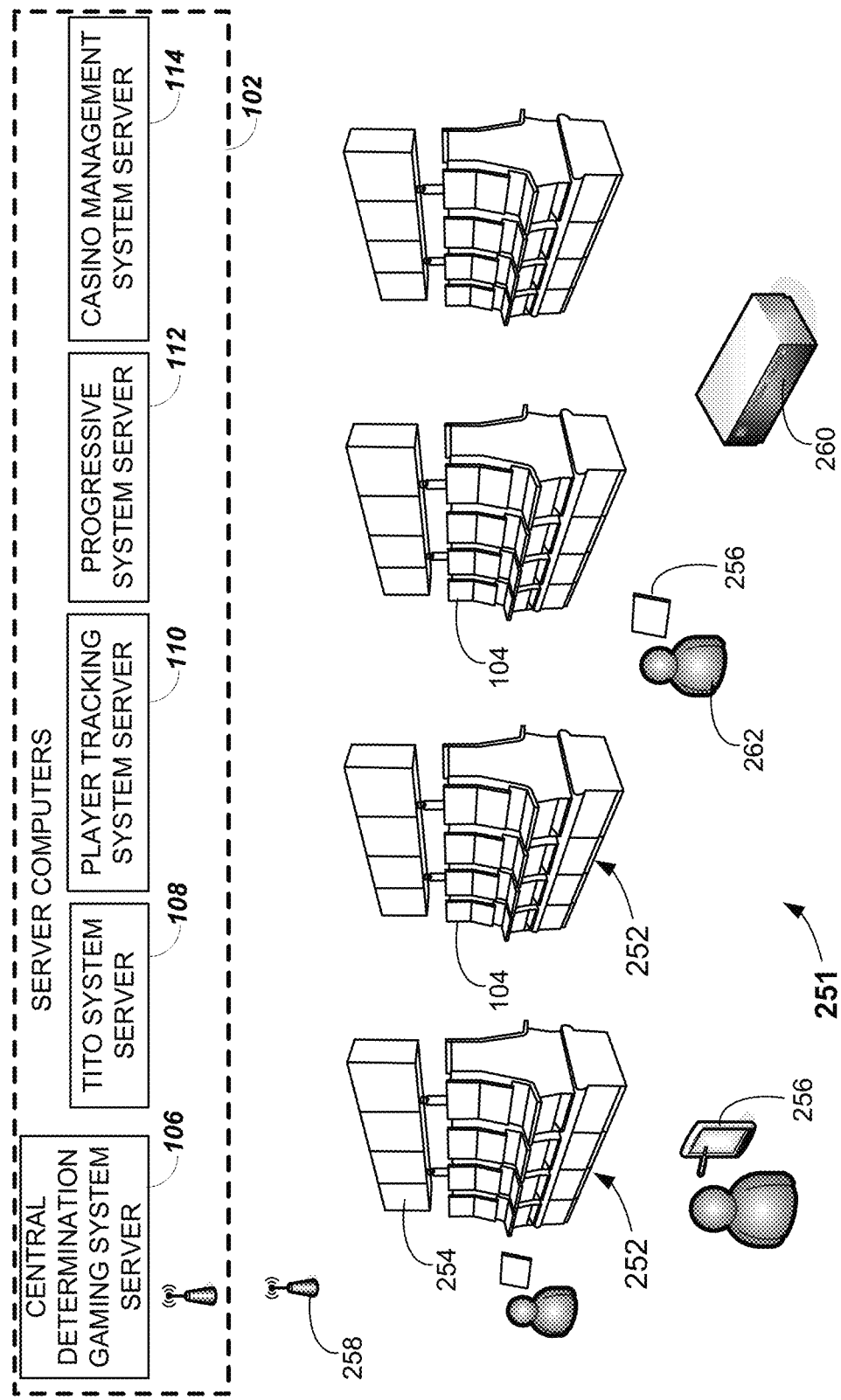
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
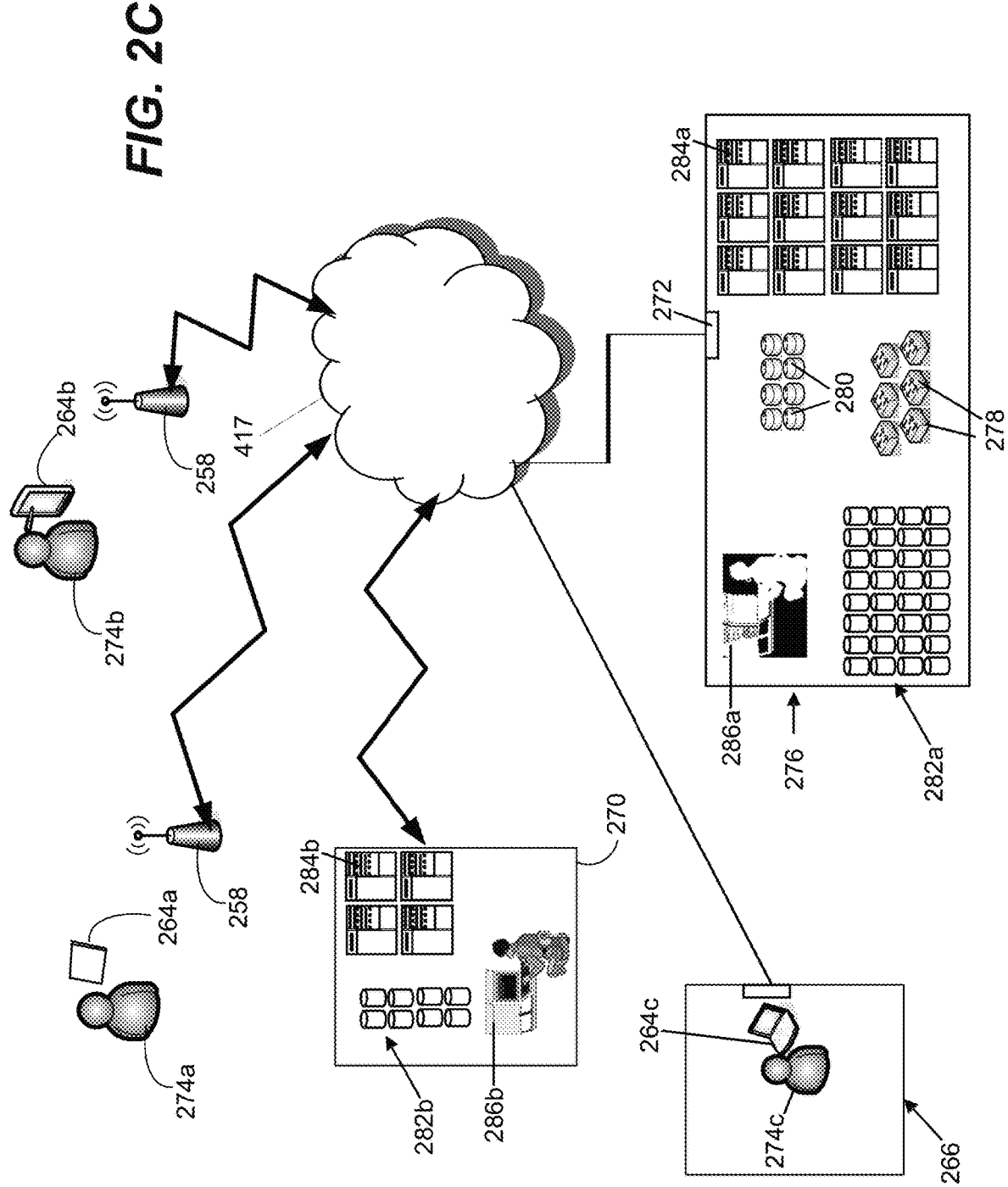
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 286a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server(s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
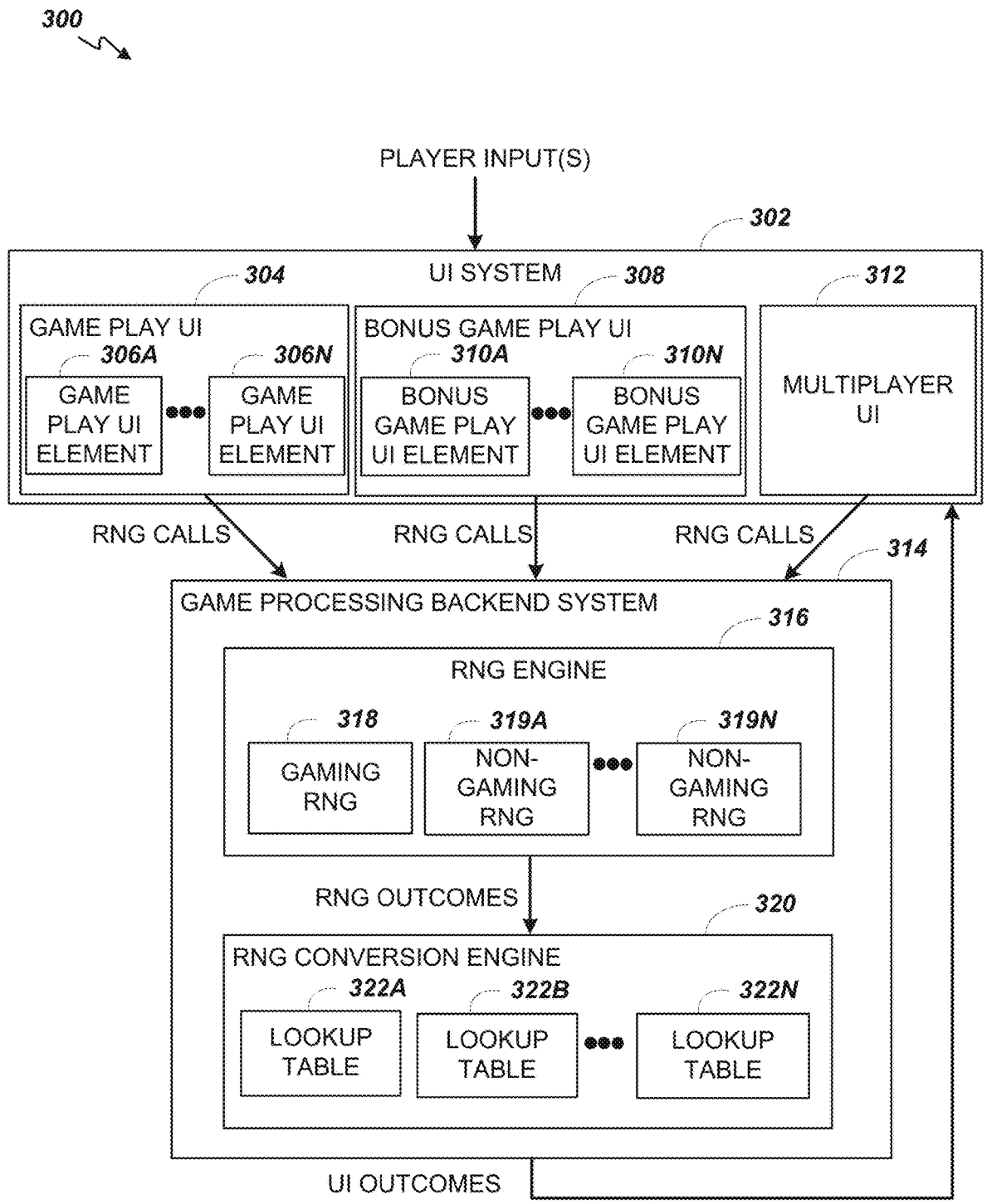
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
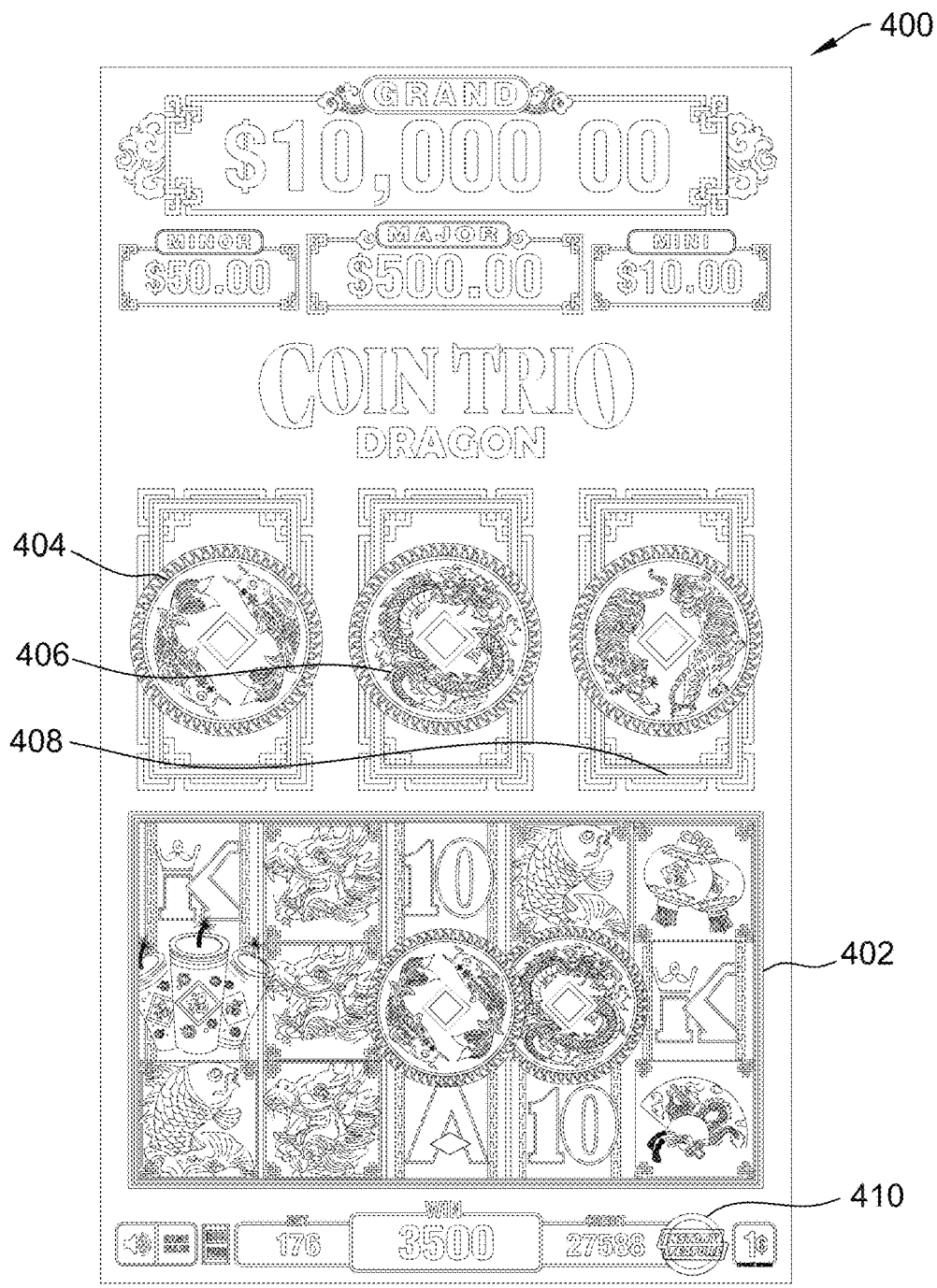
FIG. 4 is an example interface of a base game for providing an instant feature, as described herein.
Figure 4:
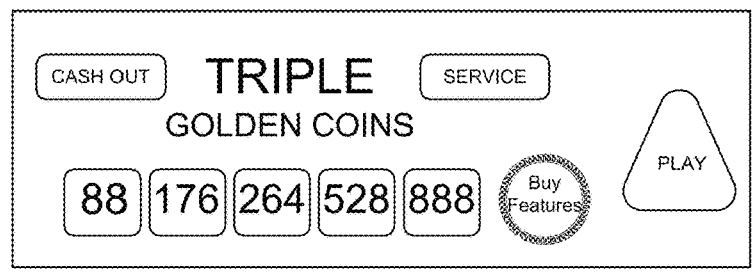

FIG. 4 is an example interface 400 of a base game for providing an instant feature, as described herein. Interface 400 includes a plurality of reels 402 for displaying a base game outcome. Included in the base game outcome may be any of instant feature coins 404-408. In some embodiments, if a certain number (e.g., all three) of coins are displayed, a feature game may be triggered. In some embodiments, the feature game may be triggered based upon any certain base game outcome. However, the feature game may also be triggered in response to player selection of feature game button 410 (e.g., in some embodiments, so long as a denomination is selected).

Figure 5A:
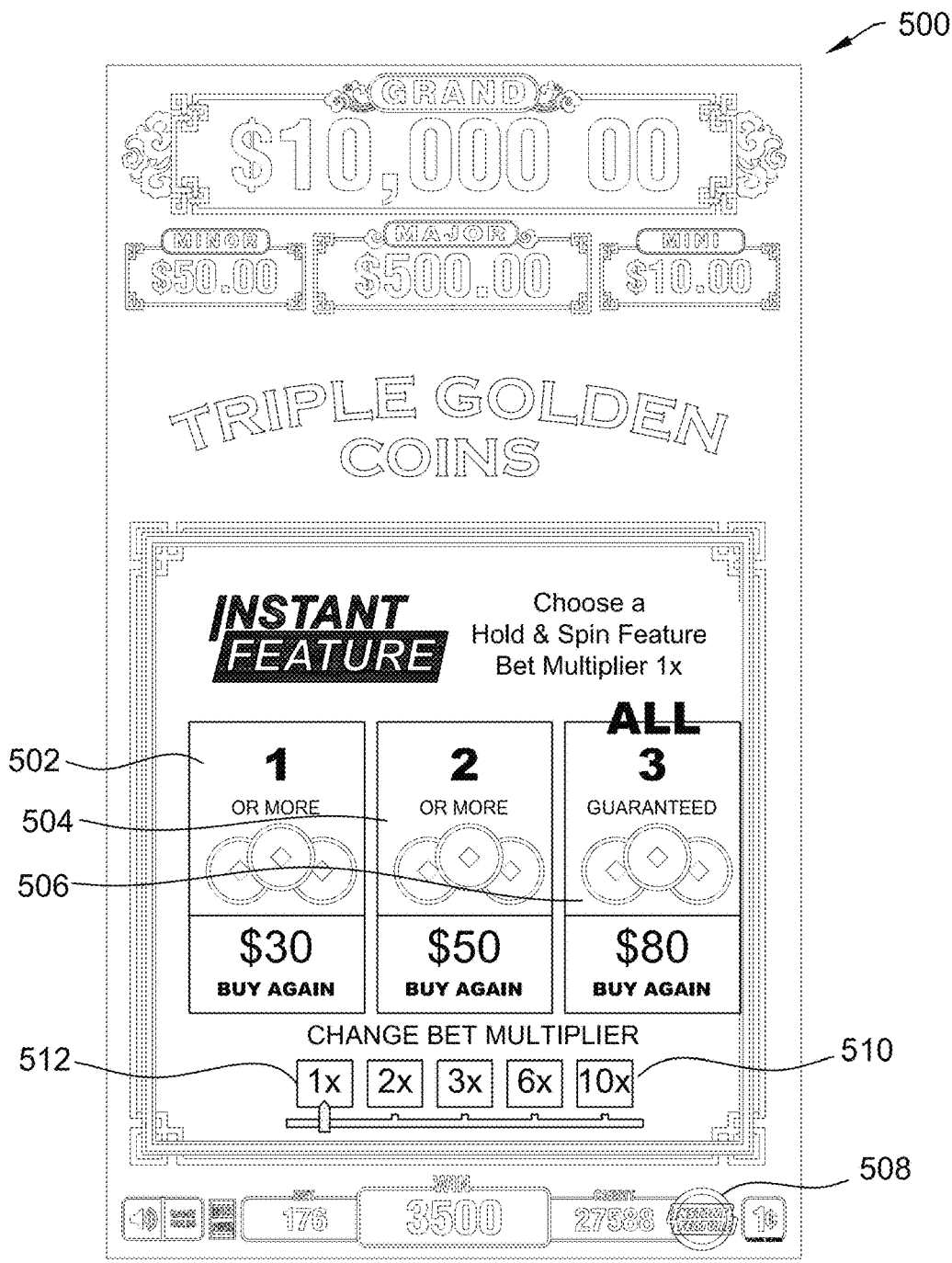
FIG. 5A is an example interface for selecting a number of instant features, as described herein.
Figure 5A:
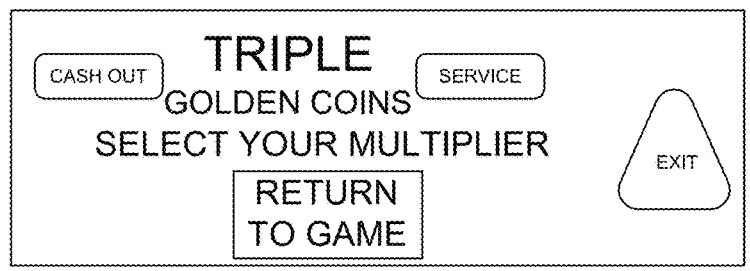

FIG. 5A is an example interface 500 for selecting a number of instant features in response to selection of feature game button 410 shown in FIG. 4. As described herein, a player may select a first number of instant features 502, a second number of instant features 504, or a third number of instant features 506. In example interface 500, features 502 correspond to at least one instant feature, features 504 correspond to at least two instant features, and features 506 correspond to all three instant features.

If features 502 are selected, the player will be presented with at least one feature and possibly all three features in the feature game. If features 504 are selected, the player will be presented with at least two features and possibly all three features in the feature game. If features 506 are selected, the player will be presented with all three features in the feature game in the feature game.

In some embodiments, features 502-506 may only be available for selection based upon a credit balance 508 in a player account associated with the player (e.g., features 502-506 not available for purchase may be greyed out/shaded or otherwise displayed differently from features 502-506 available for purchase). In some embodiments, a player may select a certain bet multiplier, from a plurality of bet multipliers 510, to be applied to the feature game. For example, interface 500 demonstrates available features 502-506 when a first multiplier 512 is selected.

Figure 5B:
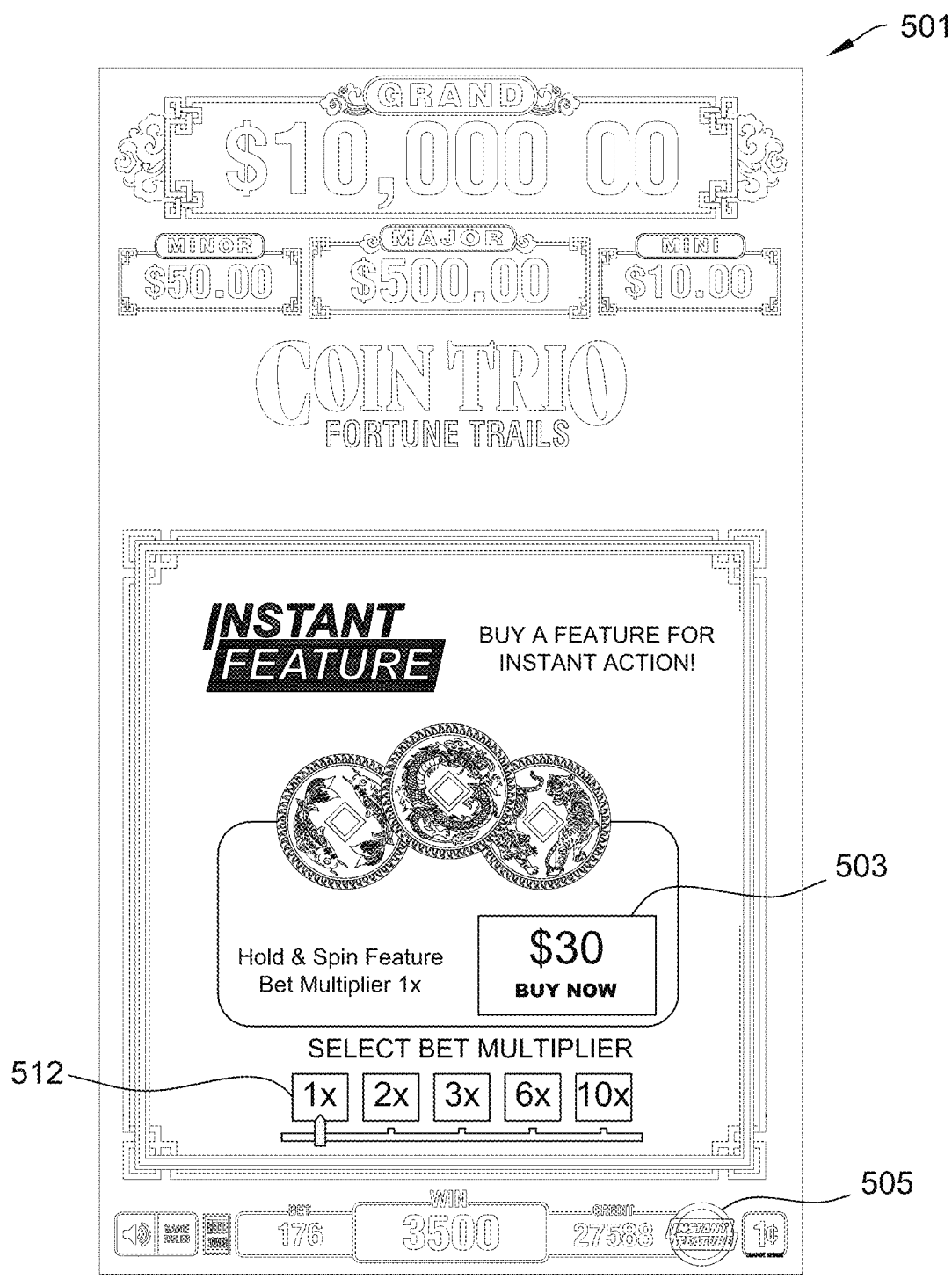
FIG. 5B is another example interface for selecting a number of instant features, as described herein.

FIG. 5B is another example interface 501 for selecting a number of instant features, as described herein. In some embodiments, including the example shown in FIG. 5B, interface 501 may provide a single option for buying at least one feature 503. For example, the player may select feature 503 (whose cost associated therewith may be determined based at least in part upon a multiplier 512 and/or wager amount). After selection of feature 503, a random number of instant features to be provided may be determined (e.g., based upon one or more RNG calls). In the example embodiment, upon selection of feature 503, any combination of the three example features described herein are determined (e.g., seven possible combinations—feature 1 only, feature 2 only, feature 3 only, features 1 and 2, etc.). In some embodiments, selection of any number of features and/or random determination of any number of features to be provided are envisioned.

Figure 6:
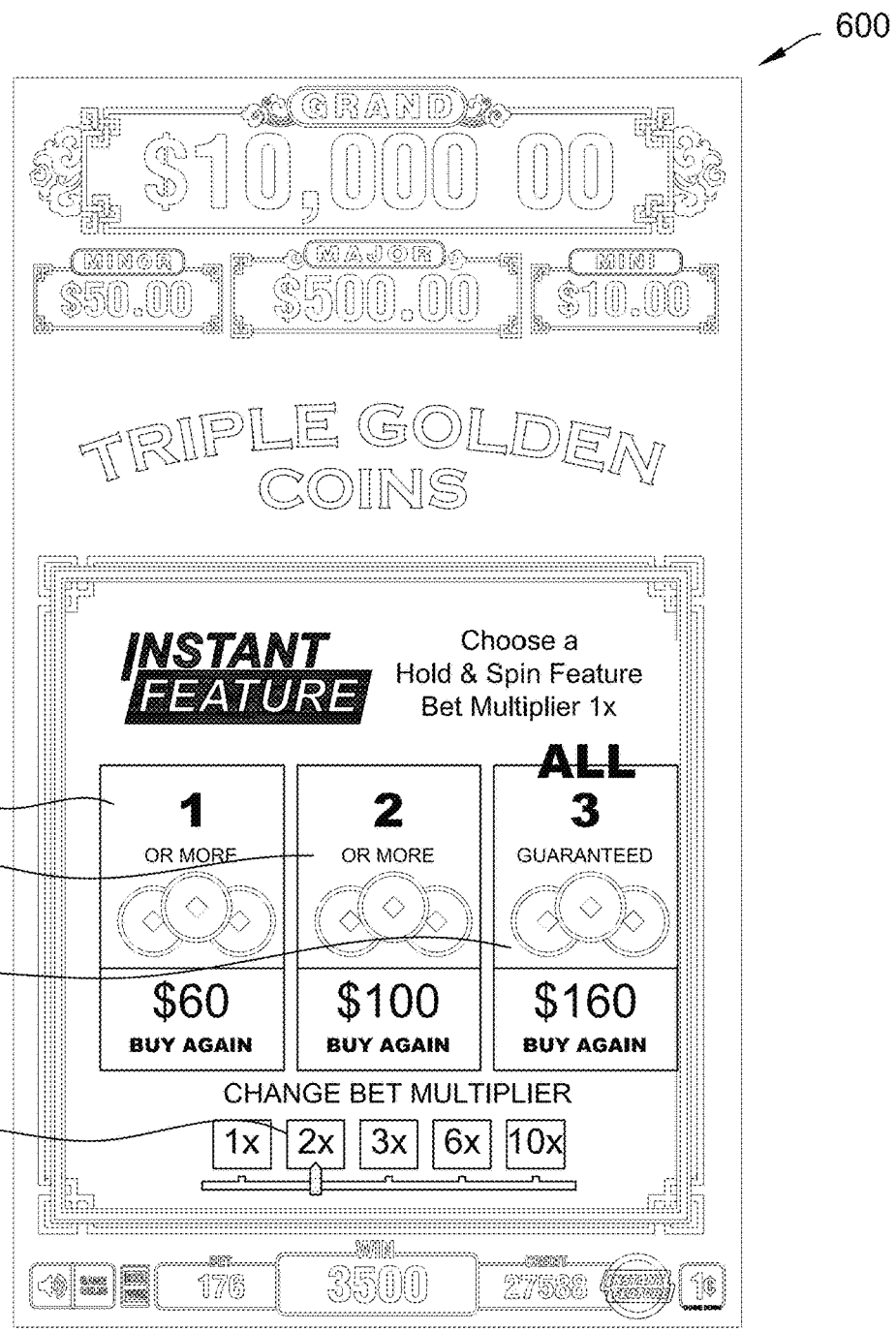
FIG. 6 is another example interface for selecting a number of instant features, as described herein.
Figure 6:
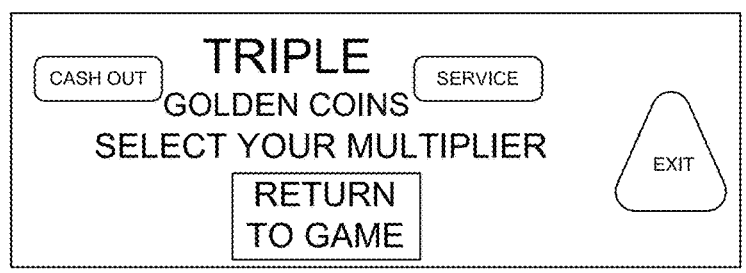

As noted above, the cost for "buying" a feature may be determined based at least in part upon a selected multiplier amount. For example, interface 600, demonstrated in FIG. 6, illustrates available features 502-506 when a second multiplier 514 is selected (e.g., the "buy now" prices of features 502-506 may scale with the multiplier selected).

Figure 7:
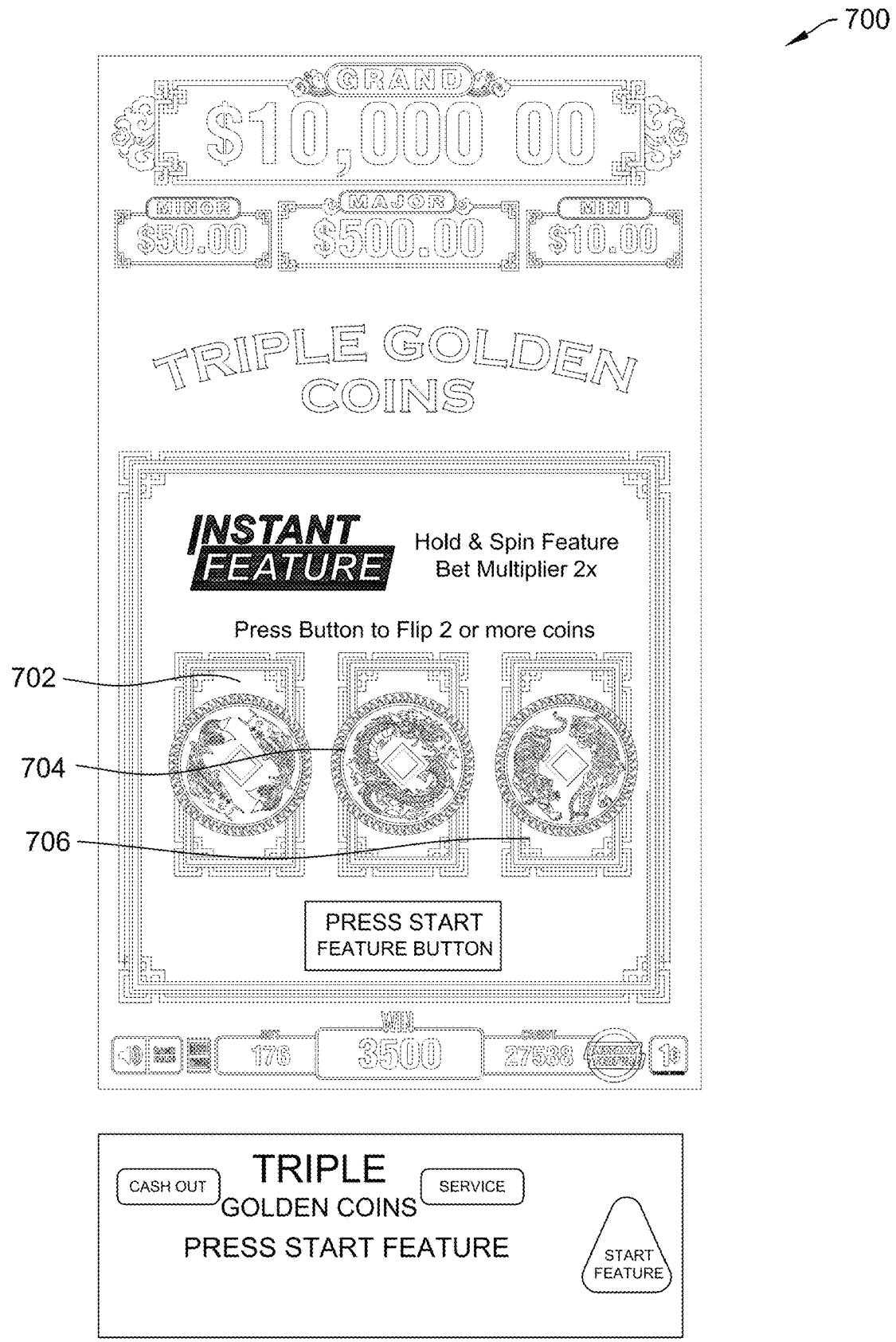
FIG. 7 is an example interface for providing an instant feature, as described herein.

In some embodiments, upon selection of a number of features 502-506, a pop-up interface may be displayed to allow the player to confirm the number of features selected. In the example embodiments, upon selection of and/or confirmation of a number of features 502-506, interface 500 transitions to an example interface 700 for providing an instant feature, as shown in FIG. 7.

As described herein, the system may receive an input (e.g., to buy at least one feature 503) requesting play of a feature game and, based upon receiving the input, initiate the feature game. A first output from a random number generator (RNG) (e.g., RNG 319A-N) may be utilized to determine at least one instant feature of a plurality of instant features to provide in the feature game. Based upon the at least one instant feature, a table of symbols, of a plurality of tables of symbols, associated with the at least one instant feature for use in the feature game may be determined such that at least one reel position of at least one reel of a plurality of reels for the feature game is populated with at least one symbol from the table of symbols (e.g., tables 322A-N), wherein the at least one symbol is associated with the at least one instant feature (e.g., see FIG. 10). Based upon a second output from the RNG, an outcome for at least one spin of the feature game may be determined and display of the feature game may be controlled including presentation of the at least one instant feature and the at least one spin.

In some embodiments, initiation of the feature game can occur regardless of the outcome of any other game (e.g., the player may buy/select the feature game and/or trigger the feature game from a base game or any other game). A number of instant features to provide in the feature game may be randomly determined (e.g., based upon an RNG output) from a plurality of instant features and at least one instant feature may be randomly determined wherein the at least one instant feature includes one instant feature for each of the number of instant features. In some embodiments, the plurality of instant features includes a first instant feature including a credit value (e.g., koi/blue), a second instant feature includes a multiplier to be applied to all displayed credit values (e.g., dragon/red), and a third instant feature includes a summation of all displayed credit values (e.g., tiger/green).

In some embodiments, an order in which to present the at least one instant feature that results in the highest output with respect to at least one other order may be determined and display of the feature game including presentation of the at least one instant feature in the order may be controlled.

In some embodiments, at least one reel position of at least one reel of a plurality of reels for the feature game may be populated with at least one symbol from a table of symbols, wherein the at least one symbol is associated with the at least one instant feature, and wherein the at least one reel includes at least one reel position associated with a placeholder, and wherein the placeholder is replaced with the at least one symbol associated with the at least one instant feature. In some embodiments, the table of symbols includes a plurality of symbols associated with the at least one instant feature, and wherein which at least one symbol of the plurality of symbols will replace the placeholder is randomly determined.

Continuing to FIG. 7, interface 700 includes coins 702-706 (e.g., corresponding to coins 404-408) each corresponding to a feature in a feature game. In the example embodiment, a number of features to be presented is determined (e.g., based upon a player selection and a random determination if less than all three features were selected). If less than all three features are determined to be presented, which of the three features to be presented are determined randomly.

Figure 8:
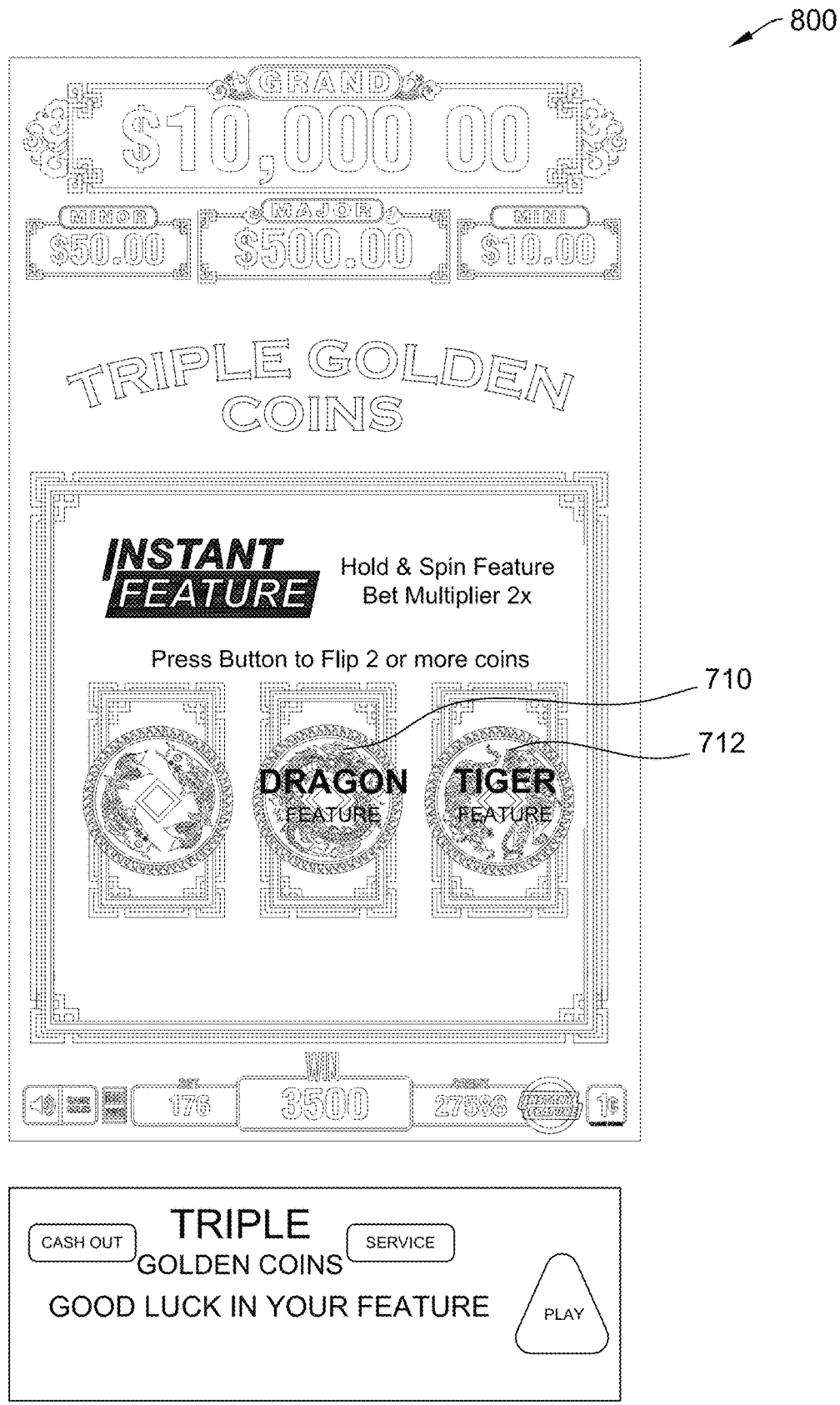
FIG. 8 is an example interface demonstrating features provided from the interface shown in FIG. 7.

For example, if a player selects at least one feature 502 or at least two features 504, two features 710, 712 may be presented as shown in interface 800 shown in FIG. 8. Further, if at least one feature 502, at least two features 504, or all three features 506 are selected, three features 708-712 may be presented as shown in interface 900 in FIG. 9. In some embodiments, coins 702-706 may be animated in anticipation of communicating to the player which features will be provided in the feature game. For example, coins 702-706 may be displayed as shaking and/or partially turning. Then, whichever coins 702-706 correspond to the features to be provided in the feature game are flipped and/or otherwise animated and display which features will be provided in the feature game. In some embodiments, when at least one feature is selected, the odds of being presented with one feature or two features may be relatively high/similar odds, while the odds of being presented with all three features may be relatively low (e.g., to control RTP, as a feature game with all three features present would be more likely to result in a higher payout).

For example, in interface 800 it is indicated that a "dragon"/red feature 710 and a "tiger"/green feature 712 will be presented while in interface 900 it is indicated that a "koi"/blue feature 708, the "dragon" feature 710, and the "tiger" feature 712 will be presented. In the example embodiment, the "koi" feature 708 corresponds to a symbol in the feature game corresponding to a high credit value (e.g., determined randomly and higher than other credit values displayed on the reels), "dragon" feature 710 corresponds to a multiplier feature that causes all displayed credit values to be multiplied by a certain amount, and "tiger" feature 712 corresponds to a symbol corresponding to the sum of all other credit values displayed on the reels. In some embodiments, any features (e.g., corresponding to any game enhancements such as multipliers, credit values, etc.) corresponding to any number of coins and/or other images/animations may be provided. The coins and features associated therewith described herein illustrate an example embodiment while other embodiments including any number of features and/or images/animations are envisioned.

Figure 9:
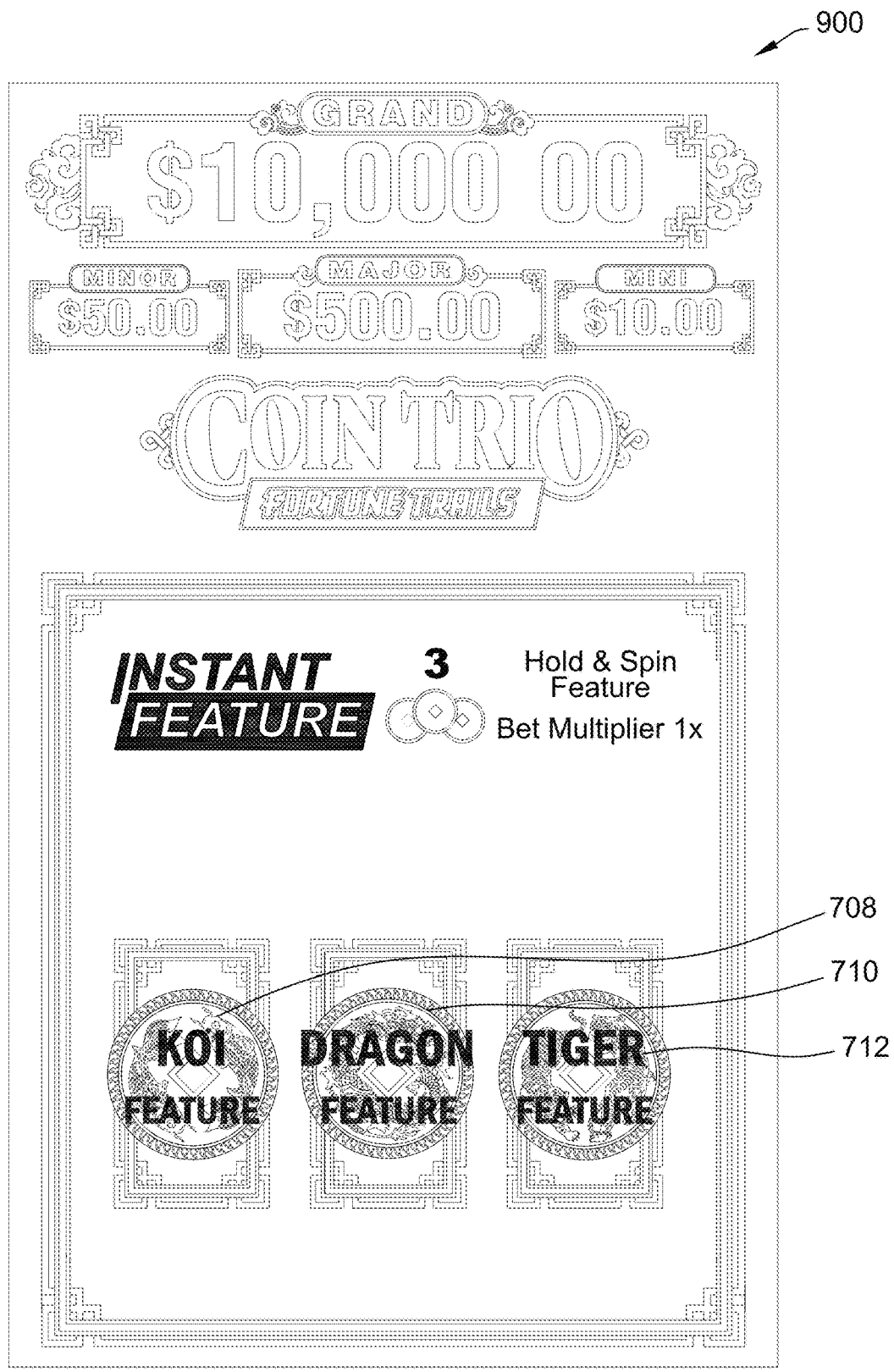
FIG. 9 is another example interface demonstrating features provided from the interface shown in FIG. 7.
Figure 10:
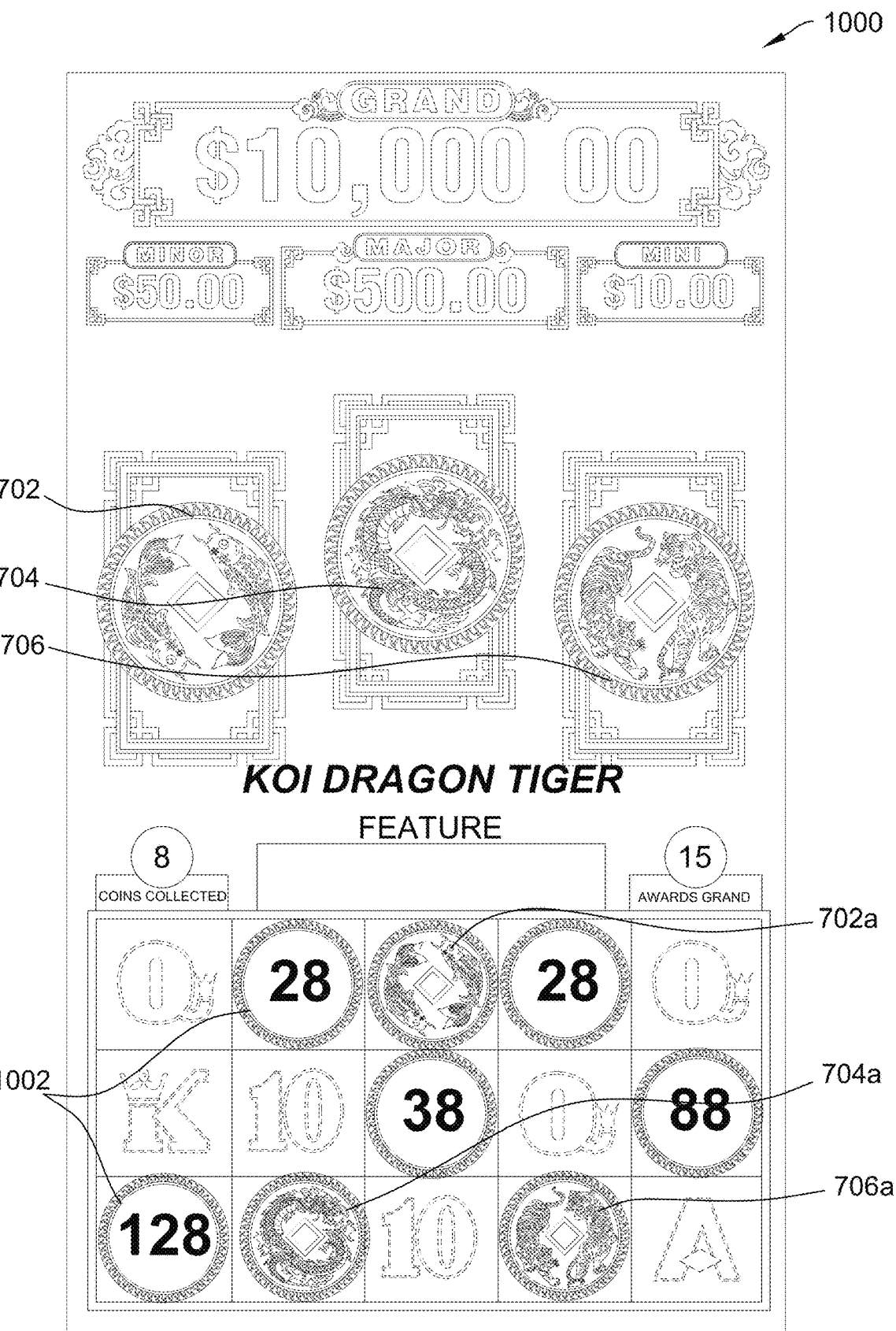
FIG. 10 is an example feature game before the instant features shown in FIG. 9 have been provided.

FIG. 10 is an example interface 1000 of a feature game before the instant features shown in FIG. 9 have been provided. In some embodiments, before the feature game is presented (e.g., as shown in FIG. 10), a base game outcome (e.g., a losing base game outcome) may be run/determined in the background and hidden from the player (e.g., for regulatory purposes). In interface 1000, coins 702-706 are displayed to indicate that the features respectively associated therewith will be presented in the feature game. As also shown in interface 1000, certain symbols 1002 are displayed on a plurality of reels to indicate credit values to be presented to the player at the end of the feature game (e.g., WYSIWYG (what you see is what you get) symbols or cash on reels symbols). Further, coins 702a-706a are displayed on the plurality of reels and correspond to coins 702-706. In the example embodiment, the displayed credit values remain in place while each other symbol position is spun as its own reel during each spin (e.g., an wherein each reel may include at least one symbol corresponding to a lookup table associated with feature(s) provided in the feature game, as described herein). If a new WYSIWYG is displayed at a symbol position previously not including a WYSIWYG, the new WYSIWYG remains stationary for remaining spins and the number of spins available to the player is reset.

For example, a player may be presented with three spins at the beginning of the feature game. During each spin, each symbol position/reel not including a WYSIWYG is spun. If a new WYSIWYG is displayed, the number of spins is reset to three. If a new WYSIWYG is not displayed, the number of spins is decremented by one. The feature game ends when either zero spins remain or each symbol position includes a WYSIWYG symbol.

Figure 11:
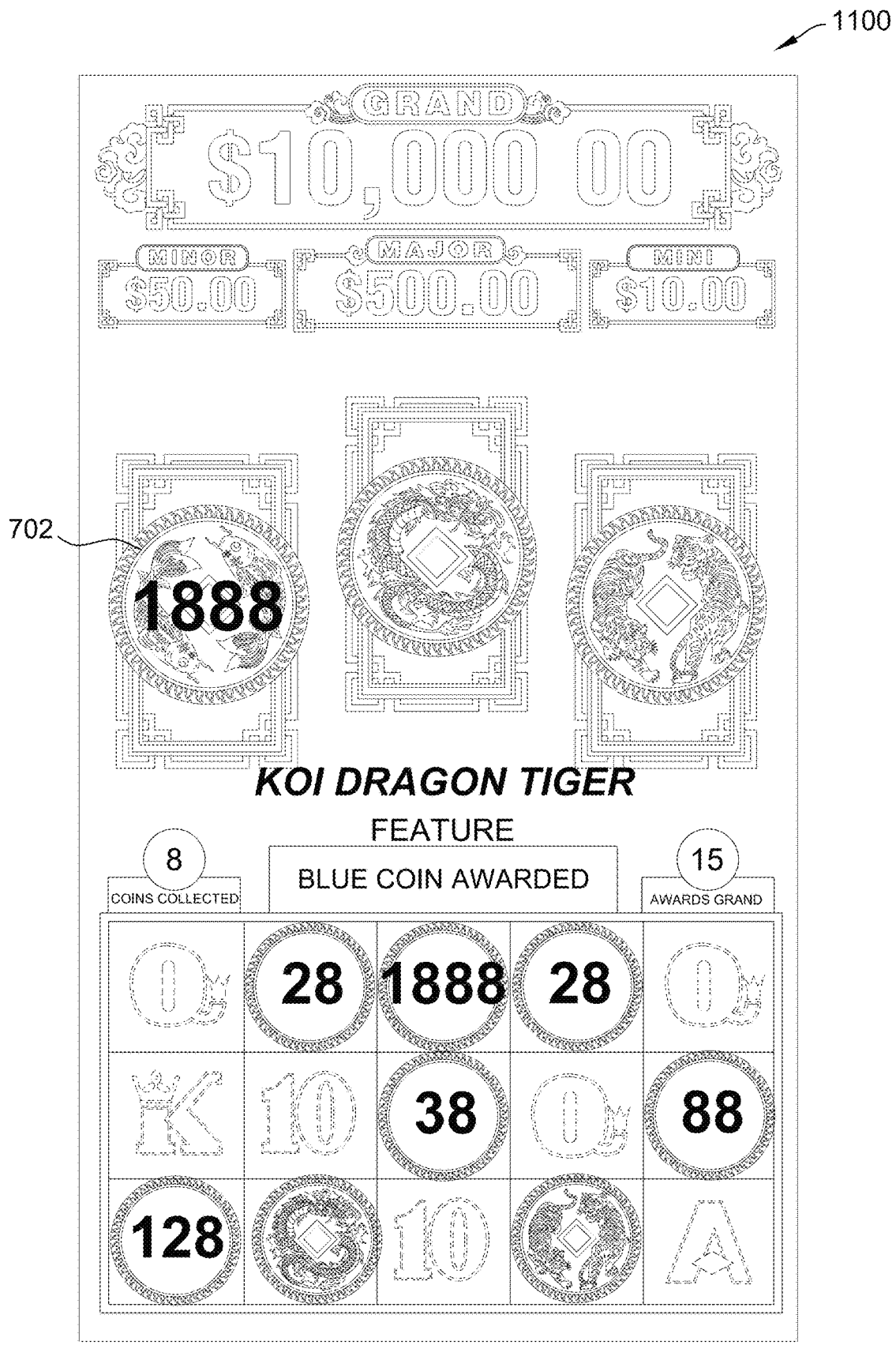
FIG. 11 is the example feature game shown in FIG. 10 after an instant feature shown in FIG. 9 has been provided.

FIG. 11 is another example interface 1100 of the feature game shown in FIG. 10 after an instant feature shown in FIG. 9 has been provided. In the example embodiment, coin 702 corresponds to a large output amount/credit value. When coin 702 is displayed during the feature game, coin 702 may "flip" over any number of times, displaying an increased credit amount with each flip, until coin 702 stops flipping and a final credit amount is displayed (e.g., on coins 702, 702a). For example, before arriving at a credit value of 1888 as shown in FIG. 11, coin 702 above may flip any number of times, displaying an increased credit value with each flip, until 1888 is displayed as the final credit amount (e.g., at coins 702 and the symbol position previously displaying coin 702a) in order to increase player anticipation and/or excitement. The final credit value displayed, and each intervening displayed credit value (e.g., after each flip), may be determined based in part upon at least one RNG call. In some embodiments, when this "blue" or Koi feature is determined to be provided, and the system determines to present a jackpot amount (e.g., MINI, MINOR, MAJOR, GRAND, etc.), the system may control the jackpot amount to be presented as a blue coin as opposed to another WYSIWYG (e.g., to increase player excitement). In some embodiments, only certain jackpots (e.g., MAJOR) may be determined to be presented as a blue/Koi feature (e.g., because the MAJOR jackpot is a more valuable jackpot than MINOR or MINI, as examples).

Figure 12:
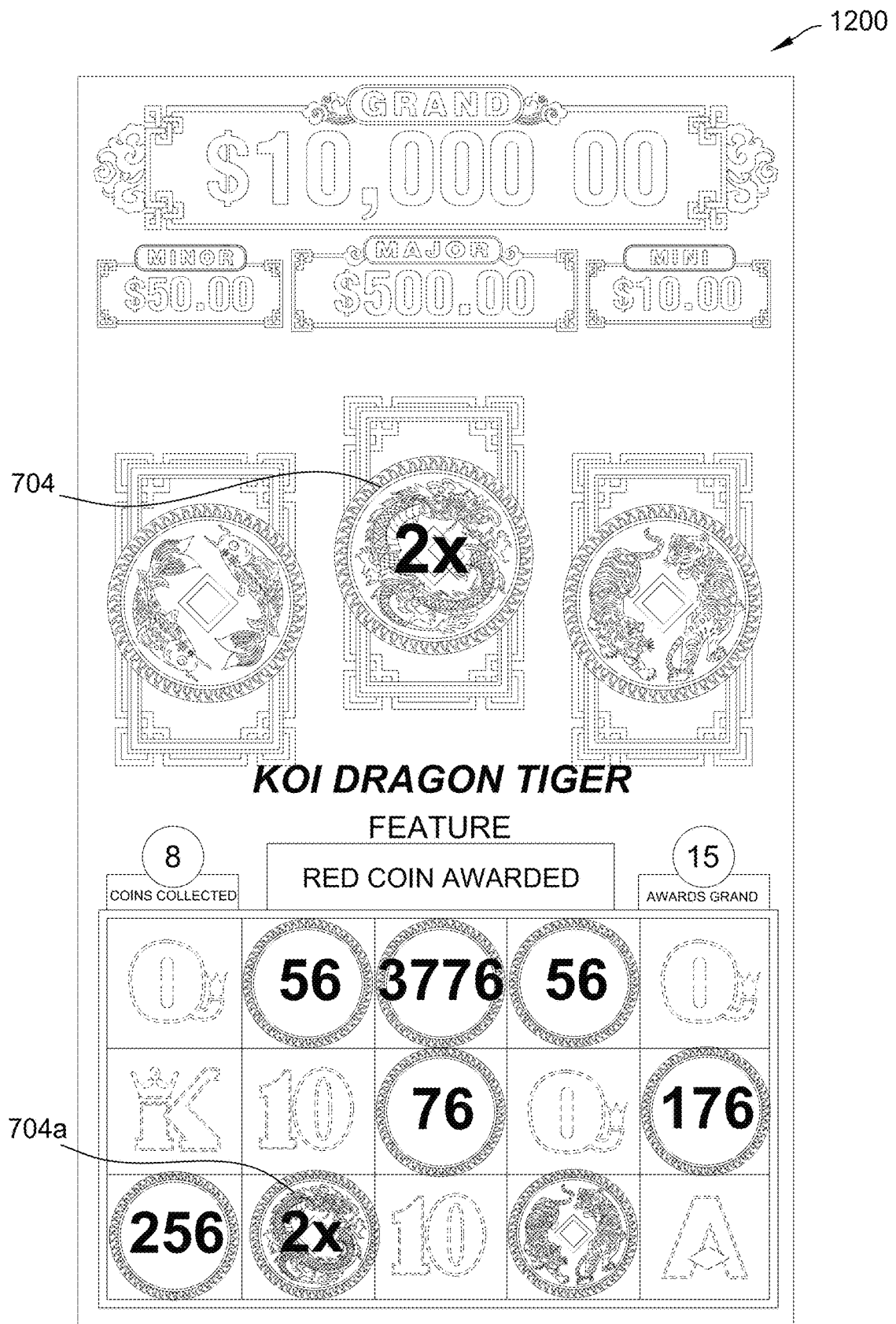
FIG. 12 is the example feature game shown in FIG. 10 after another instant feature shown in FIG. 9 has been provided.

FIG. 12 is another example interface 1200 of the feature game shown in FIG. 10 after an instant feature shown in FIG. 9 has been provided. In the example embodiment, coin 704 corresponds to a multiplier causing all other WYSIWYGs to be multiplied. For example, in FIG. 12 coins 704, 704b correspond to a multiplier of two. Accordingly, each WYSIWYG from FIG. 11 is multiplied by two in FIG. 12. After the multiplier is applied, the symbol position previously including coin 704a may replace coin 704a with a random credit amount, as shown in FIG. 13.

Figure 13:
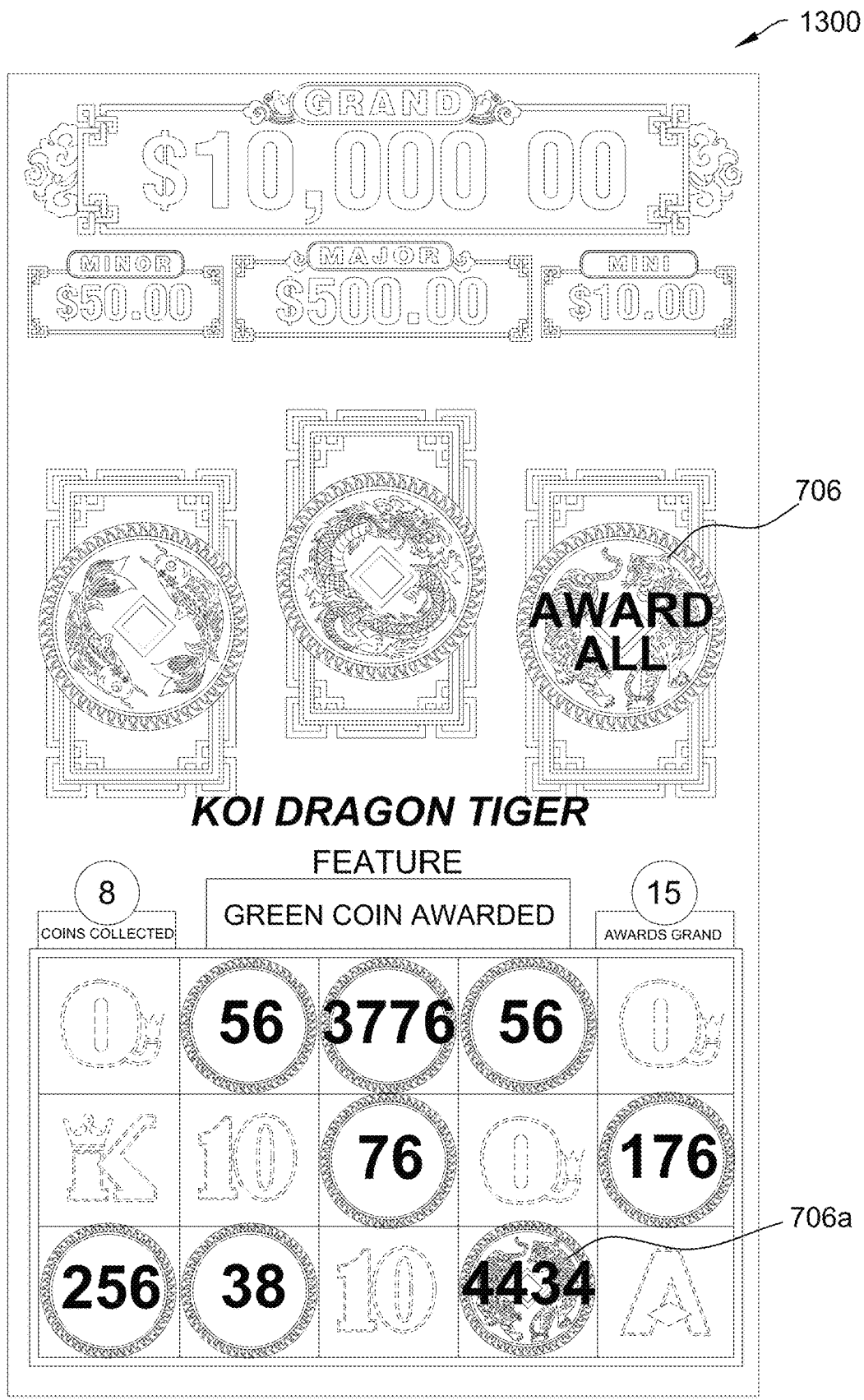
FIG. 13 is the example feature game shown in FIG. 10 after another instant feature shown in FIG. 9 has been provided.

FIG. 13 is another example interface 1300 of the feature game shown in FIG. 10 after an instant feature shown in FIG. 9 has been provided. In the example embodiment, coin 706 corresponds to a sum of all WYSIWGs displayed in FIG. 12 (e.g., AWARD ALL). Accordingly, all WYSIWYGs are added and the resulting sum, 4434 credits, is displayed as a WYSIWYG at coin 706a.

Figure 14:
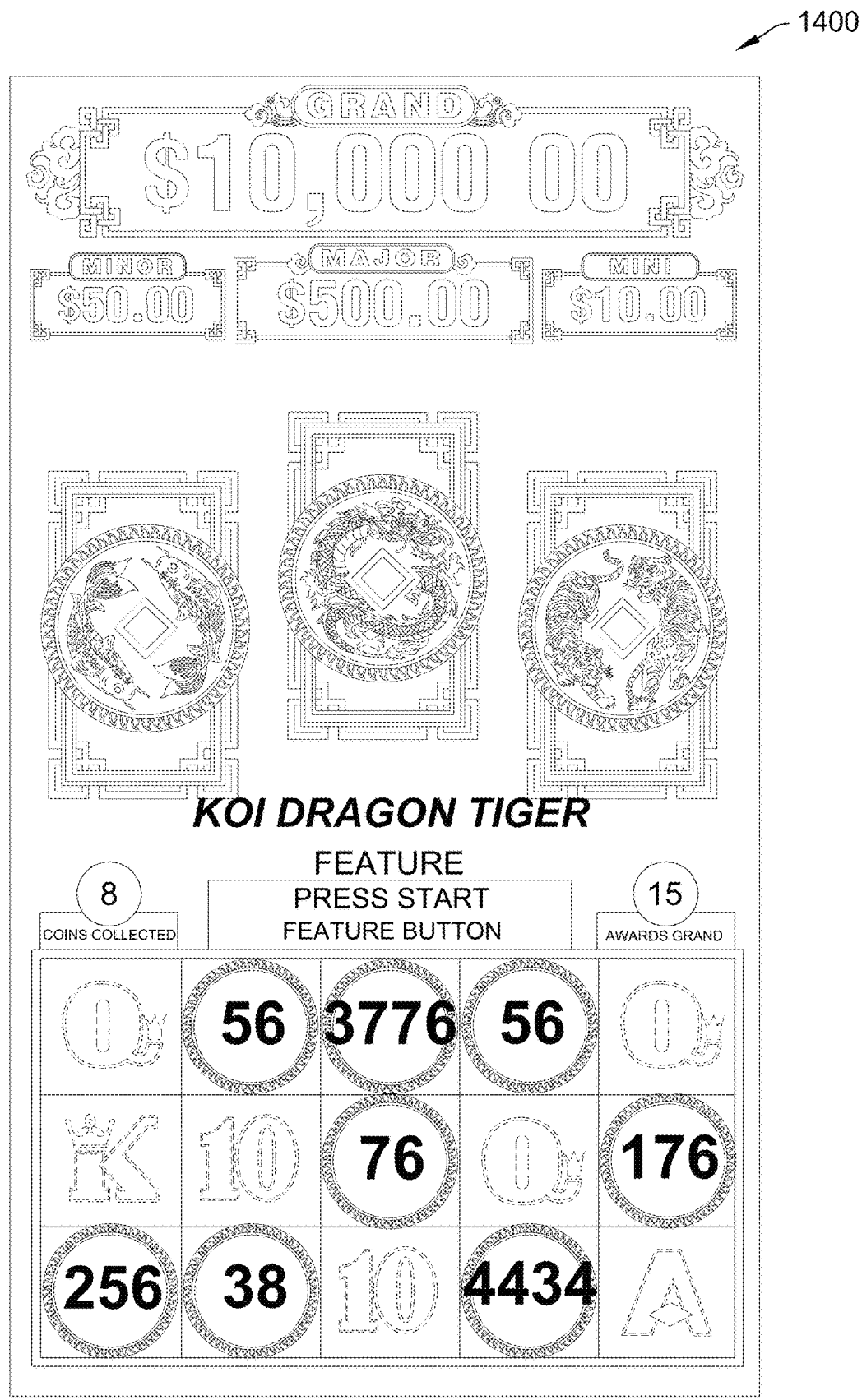
FIG. 14 is the example feature game shown in FIG. 10 after all of the instant features shown in FIG. 9 have been provided.

FIG. 14 is another example interface 1400 of the feature game shown in FIG. 10 after all of the instant features shown in FIG. 9 have been provided. Accordingly, coins 702a-706c have been replaced by WYSIWYGs as described above in greater detail. As the feature game progresses (e.g., with each spin of the individual reels not already including a WYSIWYG as described above), additional coins 702a-706a may be presented at symbol positions not previously including a WYSIWYG. Accordingly, if an additional coin 702a-706a is presented, the same feature associated with the previously presented coins 702a-706a may be presented (e.g., a blue coin corresponding to the Koi feature may have a value of 1888 credits (e.g., as shown in FIG. 11) or a new/different value, a red coin corresponding to the Dragon feature may apply another 2× multiplier to all WYSIWYGs or a different multiplier, and a green coin corresponding to the Tiger feature may have a value of 4434 credits or may include a new summation including any currently-displayed credit amounts).

In some embodiments, features may be applied in an order determined to result in the highest output to the player. For example, the feature associated with coin 702 may be presented before the feature associated with coins 704 and/or 706 such that the features associated with coins 704 and 706 (multiplication and summation respectively) will be applied to the high credit value associated with coin 702. In some embodiments, features (e.g., the number of features, the credit value/game enhancement associated with the features) may be determined based at least upon a target return to player (e.g., RTP, as described herein).

Figure 15:
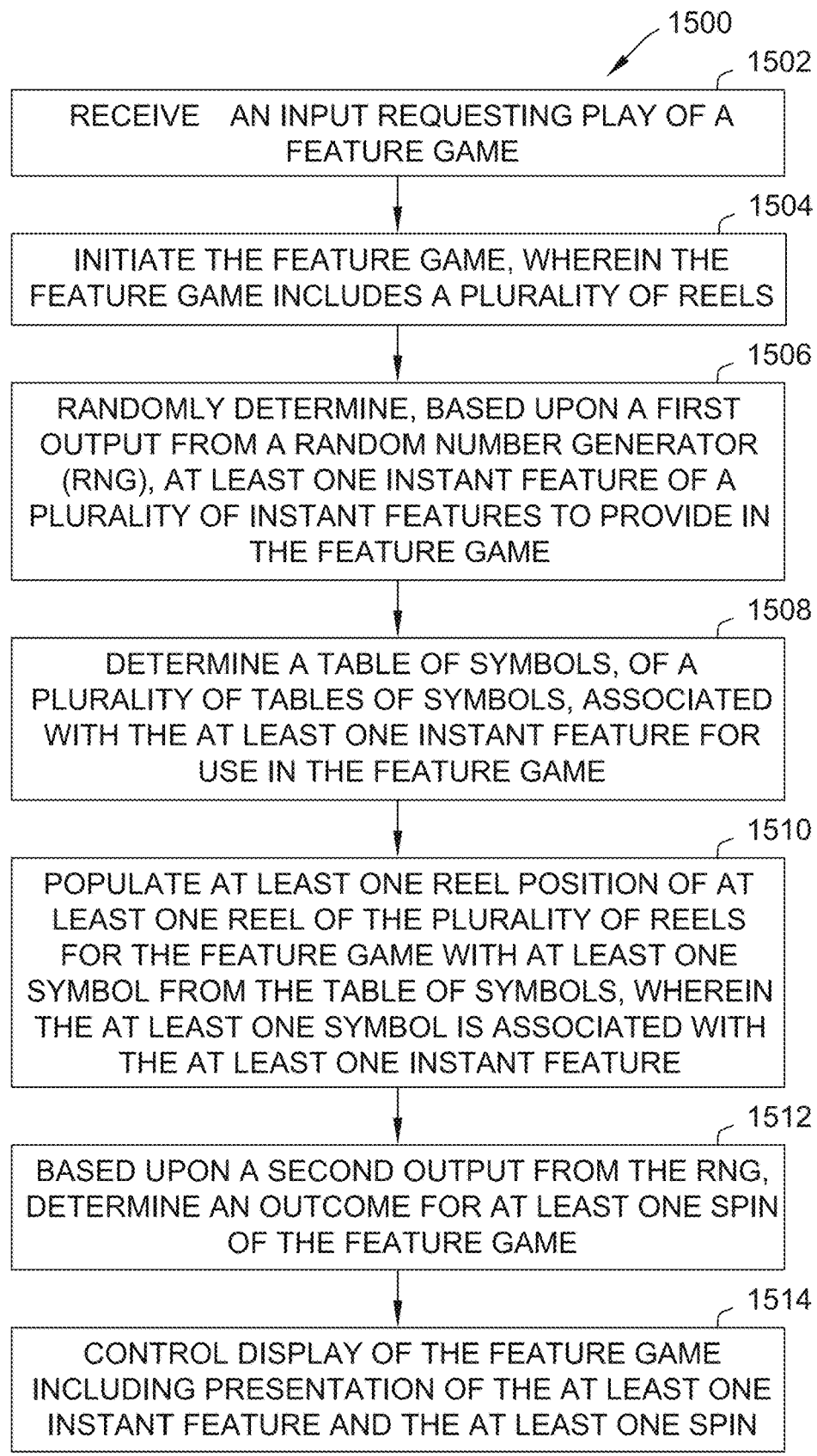
FIG. 15 is an example method for electronic gaming with one or more instant features, as described herein.

FIG. 15 is an example method 1500 for electronic gaming with one or more instant features, as described herein. In the example embodiment, method 1500 includes receiving 1502 an input requesting play of a feature game and based upon receiving the input, initiating 1504 the feature game, wherein the feature game includes a plurality of reels (e.g., see FIG. 10). Method 1500 also includes randomly determining 1506, based upon a first output from a random number generator (RNG), at least one instant feature of a plurality of instant features to provide in the feature game and based upon the at least one instant feature, determining 1508 a table of symbols, of a plurality of tables of symbols, associated with the at least one instant feature for use in the feature game. Method 1500 further includes populating 1510 and/or causing population of at least one reel position of at least one reel of the plurality of reels for the feature game with at least one symbol from the table of symbols, wherein the at least one symbol is associated with the at least one instant feature, based upon a second output from the RNG, determining 1512 an outcome for at least one spin of the feature game and controlling display 1514 of the feature game including presentation of the at least one instant feature and the at least one spin (e.g., see FIGS. 11-14).

In some embodiments, method 1500 includes initiating the feature game regardless of the outcome of any other game. In some embodiments, method 1500 includes randomly determining a number of instant features to provide in the feature game from a plurality of instant features and randomly determining the at least one instant feature, wherein the at least one instant feature includes one instant feature for each of the number of instant features.

In some embodiments, the plurality of instant features includes a first instant feature including a credit value, a second instant feature including a multiplier to be applied to all displayed credit values, and a third instant feature including a summation of all displayed credit values. In some embodiments, method 1500 includes determining an order to present the at least one instant feature that results in the highest output with respect to at least one other order and controlling display of the feature game including presentation of the at least one instant feature in the order.

In some embodiments, method 1500 includes populating the at least one reel position of the at least one reel of the plurality of reels for the feature game with at least one symbol from the table of symbols wherein the at least one symbol is associated with the at least one instant feature, and wherein the at least one reel includes at least one reel position associated with a placeholder, and wherein the placeholder is replaced with the at least one symbol associated with the at least one instant feature. In some embodiments, the table of symbols includes a plurality of symbols associated with the at least one instant feature, and wherein the instructions further cause the at least one processor to randomly determine which at least one symbol of the plurality of symbols will replace the placeholder.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming device comprising:
at least one processor in communication with at least one memory device with instructions stored thereon, wherein the instructions, when executed by the at least one processor, cause the at least one processor to:
receive an input requesting play of a feature game;
based upon receiving the input, initiate the feature game, wherein the feature game includes a plurality of reels;
randomly determine, based upon a first output from a random number generator (RNG), at least one instant feature of a plurality of instant features to provide in the feature game;
based upon the at least one instant feature, determine a table of symbols, of a plurality of tables of symbols, associated with the at least one instant feature for use in the feature game;
prior to a first spin of the feature game, control display of at least one symbol from the table of symbols at at least one reel position of at least one reel of the plurality of reels for the feature game, wherein the at least one symbol is associated with the at least one instant feature, and wherein the plurality of reels comprises a plurality of predetermined symbols and one or more placeholders;
cause the at least one instant feature associated with the at least one symbol to be provided prior to the first spin of the feature game;
identify the one or more placeholders at one or more reels of the plurality of reels;
cause each of the one or more placeholders to be replaced by one or more respective randomly determined symbols from the table of symbols associated with the at least one instant feature;
based upon a second output from the RNG, determine an outcome for the first spin of the feature game; and
control display of the first spin of the feature game, wherein the at least one symbol remains displayed at the at least one reel position during the first spin of the feature game.

2. The electronic gaming device of claim 1, wherein the instructions further cause the at least one processor to initiate the feature game regardless of the outcome of any other game.

3. The electronic gaming device of claim 1, wherein the instructions further cause the at least one processor to:
randomly determine a number of instant features to provide in the feature game from the plurality of instant features; and
randomly determine the at least one instant feature, wherein the at least one instant feature comprises one instant feature for each of the number of instant features.

4. The electronic gaming device of claim 3, wherein the plurality of instant features comprises:
a first instant feature comprising a credit value;
a second instant feature comprising a multiplier to be applied to all displayed credit values; and
a third instant feature comprising a summation of all displayed credit values.

5. The electronic gaming device of claim 3, wherein the instructions further cause the at least one processor to:
determine an order to present the at least one instant feature that results in the highest output with respect to at least one other order; and
control display of the feature game including presentation of the at least one instant feature in the order.

6. The electronic gaming device of claim 1, wherein the instructions further cause the at least one processor to:
cause display of a plurality of feature symbols during a transition from another electronic game to the feature game, wherein each of the plurality of feature symbols respectively corresponds to the plurality of instant features; and
based upon the at least one instant feature being randomly determined, cause display of at least one of the plurality of feature symbols that corresponds to the at least one instant feature as being animated to communicate that the at least one instant feature will be provided in the feature game.

7. An electronic gaming system comprising:
at least one memory device with instructions stored thereon; and
at least one processor in communication with the at least one memory device, wherein the instructions, when executed by the at least one processor, cause the at least one processor to:
receive an input requesting play of an electronic game;
based upon receiving the input, initiate the electronic game, wherein the electronic game includes a plurality of symbol positions;
randomly determine, based upon a first random number generator (RNG) output, at least one feature of a plurality of features to provide in the electronic game;
based upon the at least one feature, determine a table of symbols, of a plurality of tables of symbols, associated with the at least one feature for use in the electronic game;
prior to a first play of the electronic game, cause display of at least one symbol from the table of symbols at at least one symbol position of the plurality of symbol positions for the electronic game, wherein the at least one symbol is associated with the at least one feature, and wherein the plurality of symbol positions comprises a plurality of predetermined symbols and one or more placeholders;
cause the at least one feature associated with the at least one symbol to be provided prior to the first play of the electronic game;
identify the one or more placeholders at one or more symbol position of the plurality of symbol positions;
cause each of the one or more placeholders to be replaced by one or more respective randomly determined symbols from the table of symbols associated with the at least one feature;
based upon a second RNG output, determine an outcome for the first play of the electronic game; and
cause presentation of the first play of the electronic game, wherein the at least one symbol remains displayed at the at least one symbol position during the first play of the electronic game.

8. The electronic gaming system of claim 7, wherein the instructions further cause the at least one processor to:
randomly determine a number of features to provide in the electronic game from the plurality of features; and
randomly determine the at least one feature, wherein the at least one feature comprises one feature for each of the number of features.

9. The electronic gaming system of claim 8, wherein the plurality of features comprises:
   a first instant feature comprising a credit value;
   a second instant feature comprising a multiplier to be applied to all displayed credit values; and
   a third instant feature comprising a summation of all displayed credit values.

10. The electronic gaming system of claim 8, wherein the instructions further cause the at least one processor to:
   determine an order to present the at least one feature that results in the highest output with respect to at least one other order; and
   cause presentation of the electronic game including presentation of the at least one feature in the order.

11. A non-transitory computer-readable storage medium with instructions stored thereon that, in response to execution by at least one processor, cause the at least one processor to:
   receive an input requesting play of an electronic game;
   in response to receiving the input, trigger the electronic game, wherein the electronic game includes a plurality of symbol positions;
   randomly determine, based upon a first random number generator (RNG) output, at least one feature of a plurality of features to provide in the electronic game;
   in response to determining the at least one feature, determine a table of symbols, of a plurality of tables of symbols, associated with the at least one feature for use in the electronic game;
   prior to at least one round of the electronic game, configure at least one symbol position of the plurality of symbol positions with at least one symbol from the table of symbols, wherein the at least one symbol is associated with the at least one feature, and wherein the at least one symbol position comprises a reel, and wherein the plurality of symbol positions comprises a plurality of predetermined symbols and one or more placeholders;
   cause the at least one feature associated with the at least one symbol to be provided prior to the at least one round of the electronic game;
   identify the one or more placeholders at one or more symbol position of the plurality of symbol positions;
   cause each of the one or more placeholders to be replaced by one or more respective randomly determined symbols from the table of symbols associated with the at least one feature; and
   based upon a second RNG output, determine an outcome for at least one round of the electronic game, wherein the outcome for the at least one round includes presentation of the at least one feature during the at least one round of the electronic game, and wherein the at least one symbol remains configured at the at least one symbol position during the at least one round of the electronic game.

12. The non-transitory computer-readable storage medium of claim 11, wherein the instructions further cause the at least one processor to trigger the electronic game regardless of the outcome of any other game.

13. The non-transitory computer-readable storage medium of claim 11, wherein the instructions further cause the at least one processor to:
   randomly determine a number of features to provide in the electronic game from the plurality of features; and
   randomly determine the at least one feature, wherein the at least one feature comprises at least one feature for each of the number of features.

14. The non-transitory computer-readable storage medium of claim 13, wherein the instructions further cause the at least one processor to:
   determine an order to present the at least one feature that results in the highest outcome with respect to at least one other order; and
   determine the outcome for the at least one round, wherein the at least one round includes presentation of the at least one feature in the order.

* * * * *